United States Patent [19]

O'Clock et al.

[11] Patent Number: 5,355,389
[45] Date of Patent: * Oct. 11, 1994

[54] RECIPROCAL MODE SAW CORRELATOR METHOD AND APPARATUS

[75] Inventors: George D. O'Clock, Mankato, Minn.; Jeffrey S. Vanderpool, Colorado Springs, Colo.

[73] Assignee: Omnipoint Corporation, Colarado Springs, Colo.

[ * ] Notice: The portion of the term of this patent subsequent to Jan. 14, 2009 has been disclaimed.

[21] Appl. No.: 4,071

[22] Filed: Jan. 13, 1993

[51] Int. Cl.$^5$ .................. H04L 27/06; G06F 15/336
[52] U.S. Cl. ........................................ 375/1; 375/96; 364/728.06
[58] Field of Search ............... 364/728.06, 824; 375/1, 375/96

[56] References Cited

U.S. PATENT DOCUMENTS

| | | |
|---|---|---|
| 27,738 | 8/1973 | Takamichi et al. . |
| 3,934,203 | 1/1976 | Schiff ........................ 325/6 |
| 3,978,436 | 8/1976 | Alig et al. . |
| 4,021,898 | 5/1977 | Willis et al. . |
| 4,051,448 | 9/1977 | Coussot . |
| 4,100,498 | 7/1978 | Alsup et al. . |
| 4,131,484 | 12/1978 | Caruso et al. . |
| 4,163,944 | 8/1979 | Chambers et al. . |
| 4,189,677 | 2/1980 | Cooper et al. .............. 325/321 |
| 4,217,563 | 8/1980 | Vale . |
| 4,222,115 | 9/1980 | Cooper et al. .............. 375/1 |
| 4,247,942 | 1/1981 | Hauer . |
| 4,285,060 | 8/1981 | Cobb et al. ................. 375/1 |
| 4,314,393 | 2/1982 | Wakatsuki et al. . |
| 4,355,411 | 10/1982 | Reudink et al. ............ 455/33 |
| 4,418,393 | 11/1983 | Zscheile . |
| 4,418,425 | 11/1983 | Fennel, Jr. et al. ......... 455/27 |
| 4,425,642 | 1/1984 | Moses et al. ................ 370/76 |
| 4,425,661 | 1/1984 | Moses et al. ................ 375/1 |
| 4,432,089 | 2/1984 | Wurzburg et al. . |
| 4,445,256 | 5/1984 | Huguenin et al. . |
| 4,455,651 | 6/1984 | Baran ........................ 370/104 |
| 4,456,793 | 6/1984 | Baker et al. . |
| 4,484,028 | 11/1984 | Kelley et al. . |
| 4,517,679 | 5/1985 | Clark et al. . |
| 4,525,835 | 6/1985 | Vance et al. . |
| 4,550,414 | 10/1985 | Guinon et al. . |
| 4,561,089 | 12/1985 | Rouse et al. . |
| 4,562,370 | 12/1985 | Von Dach . . |
| 4,563,774 | 1/1986 | Gloge .......................... 455/607 |

(List continued on next page.)

OTHER PUBLICATIONS

Patent Abstracts of Japan, K. Shirahama, vol. 11, No. 309 (E-547) (2756) Oct. 8, 1987 & JP-A-62 102638, Clarion Co. Ltd.

Sixth International Conference on Digital Satellite Communications, Nanayakkara, *High Speed Receiver Designs Based on Surface Acoustic Wave Devices*, pp.

(List continued on next page.)

*Primary Examiner*—Gilberto Barron, Jr.
*Attorney, Agent, or Firm*—Lyon & Lyon

[57] ABSTRACT

A surface-acoustic-wave correlator for decoding a spread-spectrum signal having a data signal modulated with a plurality of chip sequences and reciprocal-chip sequences. A tapped-delay-line has a plurality of taps defining a tapped-delay-line structure matched to the chip sequence. In response to a plurality of first chips and second chips embedded in the spread-spectrum signal, the tapped-delay line generates TDL-chip sequences and inverse-TDL-chip sequences. A first transducer is acoustically coupled to the tapped-delay-line. In response to the spread-spectrum signal modulated by the chip sequence, the first transducer correlates a first group of the plurality of TDL-chip sequences and inverse-TDL-chip sequences and outputs a first correlation pulse. A second transducer is acoustically coupled to the tapped-delay-line. In response to the spread-spectrum signal modulated by the reciprocal-chip sequence, the second transducer correlates a second group of the plurality of TDL-chip sequences and inverse-TDL-chip sequences and outputs a second correlation pulse. In response to the first' correlation pulse and the second correlation pulse, a decision circuit outputs the first bit and the second bit, respectively.

1 Claim, 3 Drawing Sheets

U.S. PATENT DOCUMENTS

| | | | |
|---|---|---|---|
| 4,567,588 | 1/1986 | Jerrim . | |
| 4,569,062 | 2/1986 | Dellande et al. . | |
| 4,601,047 | 7/1986 | Horwitz et al. . | |
| 4,606,039 | 8/1986 | Nicolas et al. . | |
| 4,612,637 | 9/1986 | Davis et al. | 370/95 |
| 4,621,365 | 11/1986 | Chiu | 375/1 |
| 4,621,365 | 11/1986 | Chiu . | |
| 4,622,854 | 11/1986 | Locke et al. . | |
| 4,641,317 | 2/1987 | Fullerton | 375/1 |
| 4,642,505 | 2/1987 | Arvanitis . | |
| 4,647,863 | 3/1987 | Skudera, Jr. et al. | 329/112 |
| 4,647,863 | 3/1987 | Skudera et al. . | |
| 4,649,549 | 3/1987 | Halpern et al. | 380/32 |
| 4,649,549 | 3/1987 | Halpern et al. . | |
| 4,653,069 | 3/1987 | Roeder . | |
| 4,660,164 | 4/1987 | Leibowitz . | |
| 4,672,254 | 6/1987 | Dolat et al. . | |
| 4,672,658 | 6/1987 | Kavebrad et al. | 379/63 |
| 4,672,658 | 6/1987 | Kavehrad et al. . | |
| 4,680,785 | 7/1987 | Akiyama et al. . | |
| 4,691,326 | 9/1987 | Tsuchiya . | |
| 4,701,904 | 10/1987 | Darcie . | |
| 4,703,474 | 10/1987 | Foschini et al. . | |
| 4,707,839 | 11/1987 | Andren et al. . | |
| 4,718,080 | 1/1988 | Serrano . | |
| 4,724,435 | 2/1988 | Moses et al. . | |
| 4,742,512 | 5/1988 | Akashi et al. | 370/96 |
| 4,745,378 | 5/1988 | Niitsuma et al. . | |
| 4,754,453 | 6/1988 | Eizenhofer | 370/95 |
| 4,754,473 | 6/1988 | Edwards . | |
| 4,759,034 | 7/1988 | Nagazumi . | |
| 4,759,078 | 7/1988 | Schiller . | |
| 4,769,812 | 9/1988 | Shimizu . | |
| 4,774,715 | 9/1988 | Messenger | 375/1 |
| 4,787,093 | 11/1988 | Rorden | 375/23 |
| 4,800,885 | 1/1989 | Johnson | 128/633 |
| 4,804,938 | 2/1989 | Rouse et al. . | |
| 4,805,208 | 2/1989 | Schwartz . | |
| 4,807,222 | 2/1989 | Amitay . | |
| 4,813,057 | 3/1989 | Fullerton | 375/37 |
| 4,815,106 | 3/1989 | Propp et al. . | |
| 4,833,702 | 5/1989 | Shitara et al. . | |
| 4,837,786 | 6/1989 | Gurantz et al. | 370/20 |
| 4,837,802 | 6/1989 | Higashiyama et al. . | |
| 4,860,307 | 8/1989 | Nakuyama . | |
| 4,866,732 | 9/1989 | Carey et al. | 375/1 |
| 4,878,238 | 10/1989 | Rash et al. | 375/1 |
| 4,893,327 | 1/1990 | Stern et al. | 379/59 |
| 4,894,842 | 1/1990 | Broekhaven et al. . | |
| 4,901,307 | 2/1990 | Gilhousen et al. | 370/18 |
| 4,905,221 | 2/1990 | Ichiyoshi | 375/1 |
| 4,918,689 | 4/1990 | Hui | 370/85 |
| 4,945,973 | 7/1990 | Werner | 375/1 |
| 4,965,759 | 10/1990 | Uchida et al. | 364/604 |
| 4,979,186 | 12/1990 | Fullerton | 375/23 |
| 4,984,247 | 1/1991 | Kaufmann et al. | 375/1 |
| 4,995,083 | 2/1991 | Baker et al. | 380/23 |
| 5,005,183 | 4/1991 | Carey et al. | 375/1 |
| 5,008,953 | 4/1991 | Dahlin et al. | 455/33 |
| 5,016,255 | 5/1991 | Dixon et al. | 375/1 |
| 5,018,165 | 5/1991 | Sohner et al. | 375/1 |
| 5,022,046 | 6/1991 | Morrow, Jr. | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohner et al. | 375/1 |
| 5,042,050 | 8/1991 | Owen | 375/1 |
| 5,056,109 | 10/1991 | Gilhousen et al. | 375/1 |
| 5,073,899 | 12/1991 | Collier et al. | 375/1 |
| 5,073,900 | 12/1991 | Mallinckrodt | 375/1 |
| 5,081,642 | 1/1992 | O'Clock, Jr. et al. | 375/1 |
| 5,101,501 | 3/1992 | Gilhousen et al. | 375/1 |
| 5,109,390 | 4/1992 | Gilhousen et al. | 375/1 |

OTHER PUBLICATIONS

VI-16-VI—22, Sep. 1983, New York, USA.

Kavehrad, M. and McLane, P. J., *Spread Sprectrum for Indoor Digital Radio*, IEEE Communications Magazine, Jul. 1987, vol. 25, No. 5 pp. 23–40.

Robert C. Dixon, *Spread Spectrum Systems*, John Wiley & Sons, Inc., 1984; pp. 84–86, 206.

Robert C. Dixon, *Spread Spectrum System, pp. 230–232.*

Ralph Eschenbach, *Applications of Spread Spectrum Radio to Indoor Data Communications*, Hewlett-Packard Laboratories, IEEE 1982, pp. 34.5-1–34.5-3.

Mohsen Kavehrad, *Direct Sequence Spread Spectrum with DPSK Modulation and Diversity for Indoor Wireless Communications*, IEEE Transactions on Communications, vol. COM-35, No. 2, Feb. 1987 (p. 224 only).

Payne Freret et al., *Applications of Spread-Spectrum Radio to Wireless Terminal Communications*, Hewlett-Packard Laboratories, IEEE 1980, pp. 69.7.1–69.7.4.

Payne Freret, *Wireless Terminal Communications Using Spread-Spectrum Radio*, Hewlett-Packard Laboratories, IEEE 1980, pp. 244–247.

M. Kavehrad and P. J. McLane, *Performance of Low--Complexity Channel Coding and Diversity for Spread Spectrum in Indoor, Wireless Communication*, AT&T Technical Journal, vol. 64, No. 8, Oct. 1985, U.S.A.

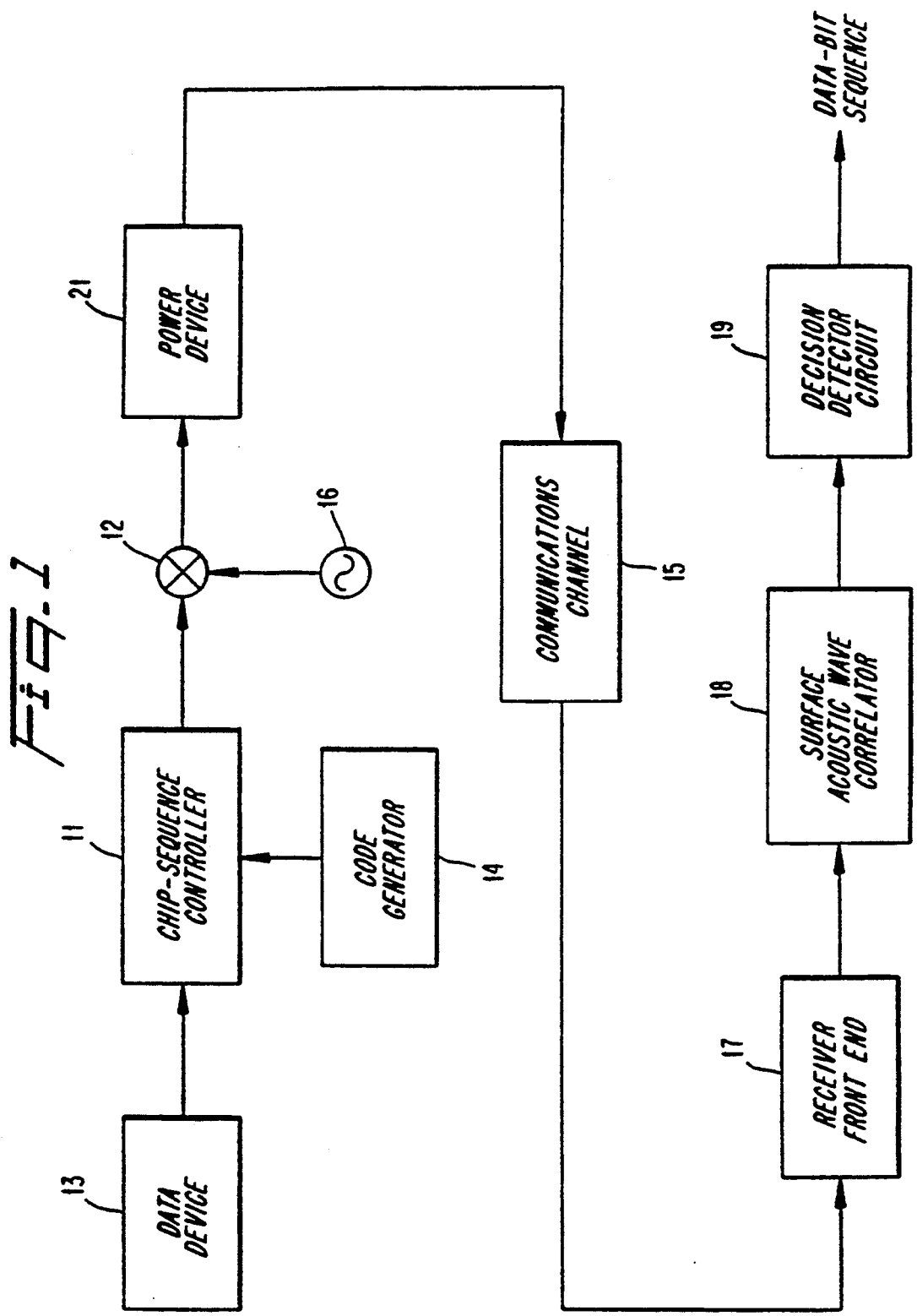

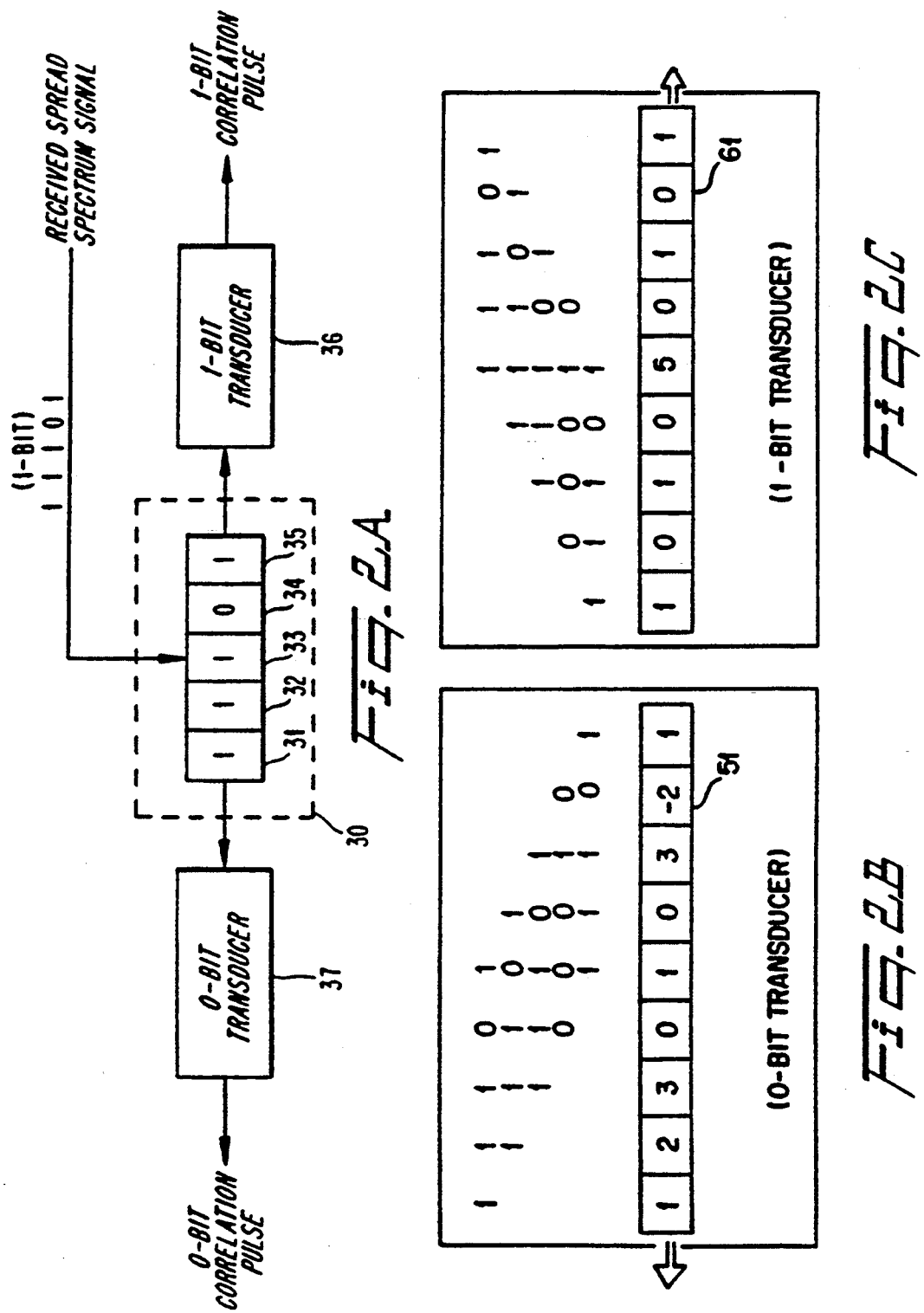

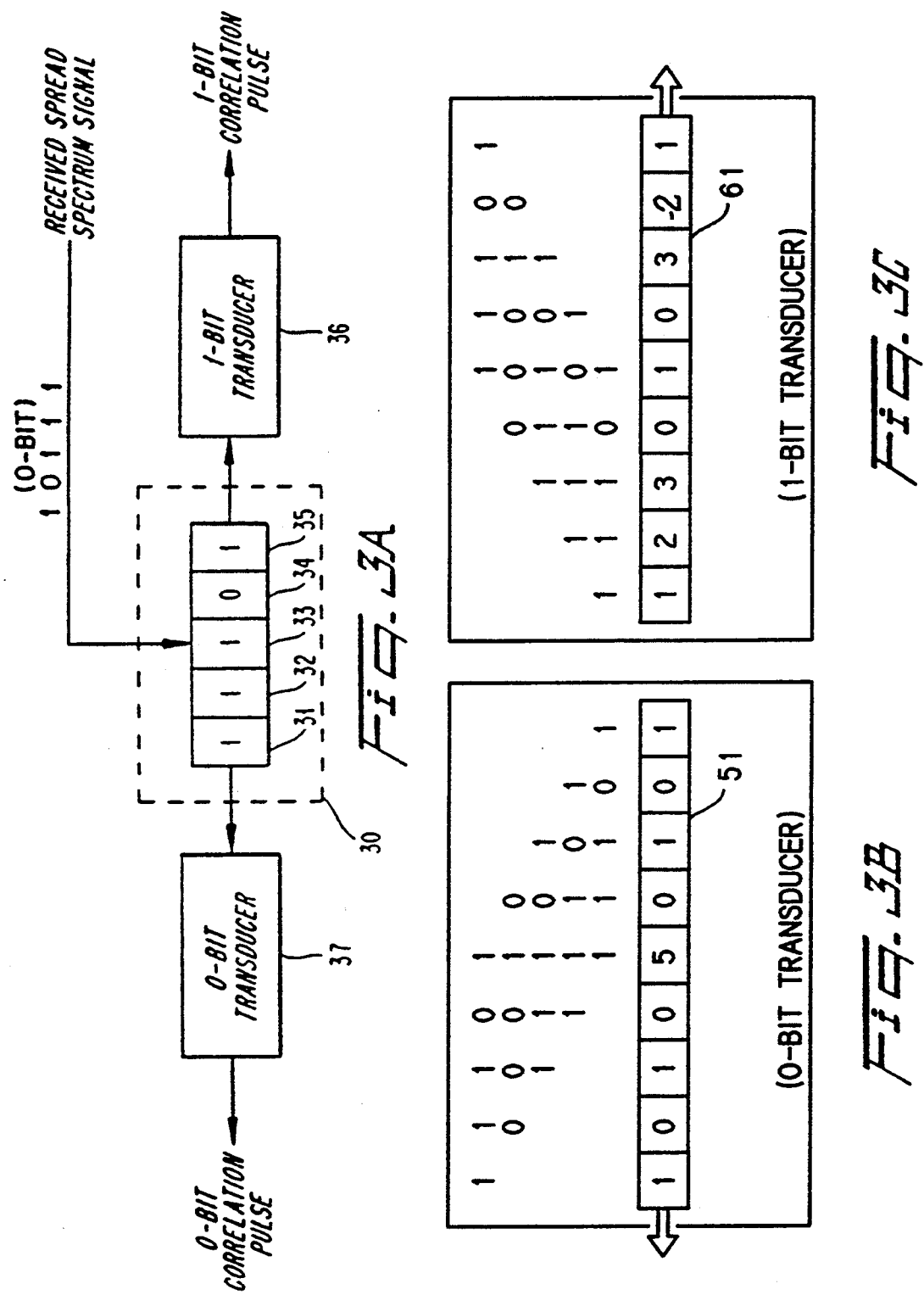

RECIPROCAL MODE SAW CORRELATOR METHOD AND APPARATUS

BACKGROUND OF THE INVENTION

1. Field of the Invention

This invention relates to spread-spectrum communications, and more particularly to a spread-spectrum signal processing technique through the use of a single phase shift encoded tapped-delay line surface-acoustic-wave correlator (SAWC) to demodulate multiple phase shift keyed (PSK) codes.

2. Description of Related Art

The effects of surface-acoustic waves applied to a piezoelectric material to convert electrical energy to acoustic energy and vice versa for analog signal processing purposes have been known and practiced in the prior art for many years. This process, as applied to phase coded SAW correlators, consists, in its most basic form, of an input transducer and a phase coded tapped-delay line matched to a phase shift encoded carrier. In general, this operation is carried out by applying an electrical signal to a transducer which consists of a sequence of metallised interdigital finger pairs deposited on the surface of a piezoelectric material. The transducer converts this electrical signal to an acoustic wave which propagates down the surface of the substrate to the tapped-delay line. Acoustic energy is converted to electrical energy at the metallised delay-line taps. When the phase encoded wave matches the phase configuration of the delay line taps, the electrical signals are added in phase with each other, and a correlation signal, which provides a signal to noise improvement, is generated and coupled to other electronic circuits through the busses of the tapped-delay line. Multiple correlations may be accomplished by placing separately encoded tapped-delay lines in parallel on the same substrate. Distinct correlation pulses will then occur upon application of matched phase shift encoded signals at the transducer input.

The reciprocal properties of SAW devices allow for this process to take place in reverse, where the tapped-delay line is excited by a phase coded electrical signal, and a correlation signal will occur at the output of the transducer. These reciprocal properties have been discussed for many years in literature and conferences. Certain kinds of devices and signal formats have shown more promise in this area than others. In 1973 J. Burnsweig of Hughes Corp. published a paper detailing the use of linear FM pulse compression matched filters operating in reciprocal manner ("Ranging and Data Transmission Using Digital Encoded FM Chirp Surface Acoustic Wave Filters", IEEE Transactions in Microwave Theory, Vol. MTT-21, pp 272-279, April 1973). This approach involves exciting the long tapped-delay line with the linear FM encoded signal and utilizing the transducers, located a certain distance away from each end of the delay line, as the elements that coherently sum the waveform segments to produce a compressed pulse. The reciprocal approach with the linear FM chirp waveform was utilized to differentiate between a "one" bit and a "zero" bit for satellite ranging/data transmission applications.

While one and zero bit differentiation has been applied toward a number of phase shift keyed (PSK) waveforms, most of these approaches appear to involve some form of acousto-electric convolver and a hybrid network. The simpler approach presented in this invention employs a SAW BPSK matched filter configuration with two transducers located near the ends of a phase coded tapped-delay line. As briefly described above, the two transducers are typically utilized as inputs either to assist in generating the BPSK sequence or serve as the input for the BPSK encoded waveform, and the tapped-delay line serves as the summing network to generate the correlation peak. The reciprocal approach involves the use of the SAW tapped-delay line as the input structure for a one bit code and a reciprocal code representing the zero bit. Coherent summation of the BPSK sequence can be sensed, at a minimum within a chip width from one edge of the tapped-delay line. The summation can be sensed by an appropriate transducer structure that has dimensions corresponding to one chipwidth along with having the correct interdigital finger spacing for the center frequency.

SUMMARY OF THE INVENTION

An object of the invention is to provide a method for demodulating multiple data bits from a phase code sequence with a single tapped-delay-line surface-acoustic-wave correlator.

Another object of the invention is to provide a spread-spectrum receiver requiring no reference code synchronization.

A further object of the invention is to provide spread-spectrum demodulation through the use of single tapped-delay-line SAW correlators which may be manufactured with highly distinctive codes.

Another object of the invention is to provide a spread-spectrum demodulator which provides a lower bandwidth to processing gain ratio and more code variability than a linear FM chirp system. The BPSK encoded sequence is more robust with respect to bandwidth narrowing and some manufacturing tolerance variations compared with the linear FM chirp waveform.

According to the present invention, as embodied and broadly described herein, a system using a surface-acoustic-wave correlator for decoding a spread-spectrum signal having a data signal modulated with a plurality of chip sequences and reciprocal-chip sequences is provided comprising communications channel, data-sequence-generating means, chip-sequence-generating means, chip-sequence-controlling means, signal means, carrier-modulating means, power means, front-end means, tapped-delay-line means and decision means. The data-sequence-generating means, chip-sequence-generating means, chip-sequence-controlling means, signal means, carrier-modulating means, power means, front-end means, tapped-delay-line means and decision means may be embodied as a data device, a code generator, a chip-sequence controller, a signal source, a product device, a power device, a receiver-front end, a tapped-delay line and a decision/detector circuit, respectively.

The data device generates a data-bit sequence having first bits and second bits. The code generator repetitively generates a chip sequence having a plurality of first chips and second chips. The chip-sequence controller outputs the chip sequence in response to each first bit, and outputs the reciprocal-chip sequence in response to each second bit. By reciprocal-chip sequence is meant a time reversed version of the chip sequence. The signal source generates a carrier signal. The product device generates the spread-spectrum signal by phase modulating the carrier signal with the chip sequence and reciprocal-chip sequence. The power device sends the spread-spectrum signal over the communications channel, and optionally helps to limit a power level of the spread-spectrum signal to less than a predetermined-threshold level at the tapped-delay line.

The receiver-front end receives the spread-spectrum signal. The tapped-delay line has a first end and a second end. The tapped-delay line also has a plurality of taps defining a tapped-delay-line structure phase-matched to the chip sequence. The tapped-delay line generates a plurality of TDL-chip sequences and inverse-TDL-chip sequences, in response to each of the plurality of first TDL chips and second TDL chips embedded in the spread-spectrum signal, respectively. A TDL chip is defined as a segment of the carrier signal of length equivalent to a period of each chip generated by the chip generator, with a first TDL chip having a first phase, and a second phase of a second TDL chip shifted with reference to the first phase.

A first transducer is coupled acoustically to the first end of the tapped-delay line. The first transducer correlates a first sequence of the plurality of TDL chips and inverse-TDL chips generated by the tapped-delay line and outputs a first correlation pulse, in response to the spread-spectrum signal modulated by the chip sequence. A second transducer is coupled acoustically to the second end of the tapped-delay line. The second transducer correlates a second sequence of the plurality of TDL chips and inverse-TDL chips generated by the tapped-delay line and outputs a second correlation pulse, in response to the spread-spectrum signal modulated by the reciprocal-chip sequence.

A decision/detector circuit outputs the first bit and the second bit in response to detecting the first correlation pulse and the second correlation pulse, respectively.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 illustrates a system using the reciprocal SAWC in a spread-spectrum receiver according to the present invention;

FIG. 2A is an equivalent block diagram for a SAWC BPSK matched filter showing a chip sequence generated by a 1-bit;

FIG. 2B shows the correlation values at the 1-bit transducer;

FIG. 2C shows the correlation values at the 0-bit transducer;

FIG. 3A is an equivalent block diagram for a SAWC BPSK matched filter showing a chip sequence generated by a 0-bit;

FIG. 3B shows the correlation values at the 0-bit transducer; and

FIG. 3C shows the correlation values at the 1-bit transducer.

DESCRIPTION OF THE PREFERRED EMBODIMENT

The invention disclosed in this patent is related to the inventions disclosed in U.S. patent application entitled "Spread Spectrum Correlator", by Robert C. Dixon and Jeffrey S. Vanderpool and having Ser. No. 07/390,315 and Filing Date of Aug. 7, 1989 now U.S. Pat. No. 5,022,047, in U.S. patent application entitled "Asymmetric Spread Spectrum Correlator" by Robert C. Dixon and Jeffrey S. Vanderpool and having Ser. No. 07/389,914 and Filing Date of Aug. 7, 1989 now U.S. Pat. No. 5,016,255, and in U.S. patent application entitled "SAWC Phase Detection Method and Apparatus" by Robert C. Dixon and having Ser. No. 07/556,147 and Filing Date of Jul. 23, 1990 now abandoned, which are incorporated herein by reference.

Reference will now be made in detail to the present preferred embodiments of the invention, examples of which are illustrated in the accompanying drawings, wherein like reference numerals indicate like elements throughout the several views.

The present invention includes a system using a surface-acoustic-wave correlator for decoding a spread-spectrum signal having a data signal modulated with a plurality of chip sequences and reciprocal-chip sequences. The system comprises a communications channel, data-sequence-generating means, chip-sequence-generating means, chip-sequence-controlling means, signal means, carrier-modulating means, power means, front-end means, tapped-delay-line means and decision means.

As illustratively shown in FIG. 1, the data-sequence-generating means, chip-sequence-generating means, chip-sequence-controlling means, signal means, carrier-modulating means, power means, front-end means, tapped-delay-line means and decision means, by way of example, may be embodied as a data a device 13, a code generator 14, a chip-sequence controller 11, an RF signal source 16, a phase modulator 12, a power device 21, a receiver-front end 17, a surface-acoustic-wave correlator 18, and a decision/detector circuit 19, respectively.

The chip-sequence controller 11 is coupled to the data device 13 and the code generator 14. The phase modulator 12 is coupled to the RF signal source 16 and the chip-sequence controller 11. The power device 21 is coupled to the product device 12.

The receiver-front end 17 is coupled to the communications channel 15. The surface-acoustic-wave correlator 18 is coupled to the receiver-front end 17. The decision/detector circuit is coupled to the surface-acoustic-wave correlator 18.

The data device 13 outputs a data-symbol sequence. The data-symbol sequence usually includes information to be communicated by the spread-spectrum signal. The data-symbol sequence may have each data symbol represent two or more data bits. In a binary case, the data-symbol sequence has each data symbol represent one data bit, and accordingly, the data-symbol sequence is known as a data-bit sequence. The data-symbol sequence, for example, may be a data-bit sequence having first bits and second bits, which are the 1-bit and 0-bit. As an example, the data device 13 may be a computer terminal, a device which has converted analog inputs such as voice, audio or video, to data, or any other source where data are to be transmitted from a transmitter to a receiver.

The code generator 14 repetitively generates a chip sequence having a plurality of first chips and second chips. The first chips and second chips are commonly known as 1 s and 0 s. The repetitively generated chip sequence is known as the spreading sequence for generating the spread-spectrum signal. In a preferred embodiment, the chip sequence is a pseudo-noise (PN) code. The code generator 14 may employ shift registers having appropriate taps for generating the chip sequence.

For the binary case, the chip-sequence controller 11 outputs the chip sequence from the code generator 14 in response to each first bit received from the data device 13, and outputs the reciprocal-chip sequence in response to each second bit received from the data device 13. Accordingly, the chip-sequence controller 11 outputs a concatenated plurality of chip sequences and reciprocal-chip sequences, in response to a concatenated plurality of first bits and second bits from data device 13.

For the binary case, the chip-sequence controller 11 causes a shift register containing the chip sequence to shift in a forward direction for each first bit, and in the reciprocal (opposite) direction for each second bit. Thus, chip-sequence controller 11 outputs a chip sequence in the case of a data 1-bit, and a reciprocal-chip sequence for data 0-bit.

By reciprocal-chip sequence is meant a time reversed version of the chip sequence. By way of example, if the chip sequence is 110101, then the reciprocal-chip sequence is 101011. Preferably, a complete sequence of the repetitively generated chip sequence or reciprocal-chip sequence is outputted from the chip-sequence controller 11 for each data symbol. A chip sequence optionally may be generated coherently with each data symbol of the data-symbol sequence, and each data symbol determines whether a chip sequence or its reciprocal is generated.

The signal source 16 generates a carrier signal. The term "carrier signal" is defined herein to be any signal at an RF, intermediate frequency (IF), or other frequency at which the surface-acoustic-wave correlator 18 operates. The center frequency of the carrier signal is matched to the surface-acoustic-wave correlator 18 used at the receiver.

The carrier-modulating means is coupled to the chip-sequence-controlling means and the signal source 16, and may be embodied as a product device or, as illustrated in FIG. 1, a phase modulator 12. The phase modulator 12 generates the spread-spectrum signal by phase modulating the carrier signal from the signal source 16 with the plurality of chip sequences and reciprocal-chip sequences from the chip-sequence controller 11, causing phase shifts in the carrier signal corresponding to each state transition of the chip sequence. The spread-spectrum signal is the carrier signal modulated with the output from the chip-sequence controller 11. The phase modulator 12 outputs the spread-spectrum signal to the power device 21.

The power device 21 sends the spread-spectrum signal over the communications channel 15, and limits a power level of the spread-spectrum signal to less than a predetermined-threshold level at the input to the surface-acoustic-wave correlator 18. The power device 21 is optional, and includes any power amplifier and/or power limiter. Typically, the power device 21 is coupled to a communications channel from the surface-acoustic-wave correlator 18. The transmitter power is adjusted to help maintain the power level at the input to the surface-acoustic-wave correlator 18 to below a predetermined-threshold level which prevents the surface-acoustic-wave correlator 18 from operating in a non-linear range. In some commercially available devices, the predetermined-threshold level has been found to be less than 20 dBm.

The communications channel 15 may be any medium where the spread-spectrum signal may propagate or travel.

The receiver-front end 17 receives the spread-spectrum signal from the communications channel 15. The receiver-front 17 end includes any antenna, amplifier and/or impedance matching circuitry coupling the surface-acoustic-wave correlator 18 to the communications channel 15.

The present invention includes a phase coded surface-acoustic-wave correlator 18 for demodulating a received spread-spectrum signal. The surface-acoustic-wave correlator 18 comprises tapped-delay-line means, first transducer means and second transducer means. As illustratively shown in FIGS. 2A and 3A, the tapped-delay-line means, first transducer means and second transducer means may be embodied as tapped-delay line 30, first transducer 36, and second transducer 37. The spread-spectrum signal has a data signal embedded in a carrier signal by phase modulating the carrier signal with a chip sequence and a reciprocal-chip sequence, as previously described. The received spread-spectrum signal is applied to the tapped-delay-line bus, which serves as the surface-acoustic-wave correlator 18 input. The tapped-delay line bus converts the electrical signal received to an acoustic signal. When a phase-matched-chip sequence is received at the surface-acoustic-wave correlator 18, an output transducer will output a correlation pulse, which is applied to the detection means, which may be embodied as an amplitude and/or phase detector 19.

In a tapped-delay line, as the electrical signal is converted to acoustical energy, an acoustic wave propagates on the surface of a substrate, with each chip width section of the wave adding in or out of phase with the delay line fingers. When the acoustic waves reach the output transducers at each end of the tapped-delay line, the phase components of the wave are summed to create a correlation pulse whose amplitude is in direct proportion to the number of phase matches of the delay line. The output transducers convert this acoustic energy to electrical energy and output the correlation pulse in the form of an amplitude modulated RF signal of frequency equivalent to the center frequency of the surface-acoustic-wave correlator 18 and the received spread-spectrum signal.

More particularly, as shown in FIGS. 2A and 3A, the tapped-delay-line 30 has a plurality of taps defining a tapped-delay-line structure. In the exemplary arrangement shown, the tapped-delay line 30 has five taps 31, 32, 33, 34, 35. The tapped-delay-line structure has the taps adjusted to provide a phase match with a received spread-spectrum signal modulated by the chip sequence or reciprocal-chip sequence.

The tapped-delay line 30 has a first end and a second end. The first transducer 36 is acoustically coupled to the first end of the tapped-delay line 30. The second transducer 37 is acoustically coupled to the second end of the tapped-delay line 30. The tapped-delay line 30 generates a plurality of TDL-chip sequences and inverse-TDL-chip sequences, in response to each chip of the plurality of first chips and second chips embedded in the spread-spectrum signal, respectively.

FIGS. 2A, 2B, and 2C illustrate the case for a received spread-spectrum signal being a 1-bit, which is represented by the chip sequence 11101. The received spread-spectrum signal is applied to the tapped-delay-line bus, which serves as the input to the tapped-delay line 30. Each 1-chip of the chip sequence 11101 generates in the tapped-delay line a tapped-delay-line-chip sequence (TDL-chip sequence), 11101, and each 0-chip generates in the tapped-delay line an inverse-TDL-chip sequence, 00010. The generation of each TDL-chip sequence and inverse-TDL-chip sequence is delayed in time by the time equivalent of one chip. FIG. 2B shows a group of TDL-chip sequences and an inverse-TDL-chip sequences as they propagate as acoustic waves toward the first end of the tapped-delay line 30. The group shown in FIG. 2B is in response to the chip sequence 11101, which represents the 1-bit. FIG. 2C shows the output 61 of the first transducer 36, illustrated as a 1-bit transducer, which is the sum of the chips at any point in time. The 1-chips add in-phase with the TDL structure and are given a value of +1 and the 0-chips add out-of-phase with the TDL structure and are given a value of −1. The output 61 shows that the first transducer 36 generates a maximum value of 5, and accordingly the first correlation pulse is generated when the total of the output 61 reaches 5.

FIG. 2B shows a group of TDL-chip sequences and an inverse-TDL-chip sequence as they propagate as acoustic waves toward the second end of the tapped-delay line 30. The group shown in FIG. 2B is in response to the chip sequence 11101, which represents the 1-bit. The output 51 of the second transducer 37, illustrated as a 0-bit transducer, is the sum of the chips at any point in time. The 1-chips add in-phase with the TDL structure and are given a value of +1 and the 0-chips add out-of-phase with the TDL structure and are given a value of −1. The output 51 shows that the second transducer 37 does not generate the maximum level, since the levels are below a maximum value.

The decision/detector circuitry 19 detects which output of the first transducer 36 and second transducer 37 produced the maximum value, and thereby outputs a 1-bit if the maximum value is from the first transducer 36.

FIGS. 3A, 3B, and 3C illustrate the case for a received spread-spectrum signal being a 0-bit, which is represented by the reciprocal-chip sequence 10111. The received spread-spectrum signal is applied to the tapped-delay-line bus, which serves as the input to the tapped-delay line 30. Each 1-chip of the chip sequence 10111 generates a tapped-delay-line-chip sequence (TDL-chip sequence), 11101, and each 0-chip generates an inverse-TDL-chip sequence, 00010. The generation of each TDL-chip sequence and inverse-TDL-chip sequence is delayed in time by the time equivalent of one chip. FIG. 3B shows a group of TDL-chip sequences and an inverse-TDL-chip sequence as they propagate as acoustic waves toward the second end of the tapped-delay line 30. The group shown in FIG. 3B is in response to the reciprocal-chip sequence 10111, which represents the 0-bit. The output 51 of the second transducer 37 is the sum of the chips at any point in time. The 1-chips add as a +1 and the 0-chips add as a −1, as stated previously. The output 51 shows that the second transducer 37 generates a maximum level of 5, and accordingly the second correlation pulse is generated when the total of the output 51 reaches 5.

FIG. 3C shows a group of TDL-chip sequences and an inverse-TDL-chip sequence as they propagate as acoustic waves toward the first end of the tapped-delay line 30. The group shown in FIG. 3C is in response to the reciprocal-chip sequence 10111, which represents the 0-bit. The output 61 of the first transducer 36 is the sum of the chips at any point in time. The 1-chips add as a +1 and the 0-chips add as a −1, as stated previously. The output 61 shows that the first transducer 36 does not generate the maximum value, since the values are below the maximum value.

The decision/detector circuitry 19 detects which output of the first transducer 36 and second transducer 37 produces the maximum value, and thereby outputs a 0-bit if the maximum value is from the second transducer 37.

Accordingly, the first transducer 36 correlates a first group of the plurality of TDL-chip sequences and inverse-TDL-chip sequences generated by the tapped-delay line 30 and outputs a first correlation pulse, in response to the spread-spectrum signal modulated by the chip sequence. The first transducer 36 at the first end of the tapped-delay line 30 produces a first correlation pulse representing a data 1-bit, in response to the received spread-spectrum signal modulated with the chip sequence. Similarly, the second transducer 37 correlates a second group of the plurality of TDL-chip sequences and inverse-TDL-chip sequences generated by the tapped-delay line 30 and outputs a second correlation pulse, in response to the spread-spectrum signal modulated by the reciprocal-chip sequence. The second transducer 37 at the second end of the tapped-delay line produces a second correlation pulse representing a data 0-bit in response to the received spread-spectrum signal modulated with the reciprocal-chip sequence.

A decision/detector circuit 19 outputs the first bit and the second bit in response to detecting the first correlation pulse and the second correlation pulse at the outputs of the first transducer 36 and second transducer 37, respectively.

The present invention further includes a method using a surface-acoustic-wave correlator having a tapped-delay line for decoding a spread-spectrum signal having a data signal modulated with a plurality of chip sequences and a reciprocal-chip sequences. The method comprises the steps of: generating a plurality of TDL-chip sequences and inverse-TDL-chip sequences with the tapped-delay line in response to a plurality of first chips and second chips embedded in the spread-spectrum signal matching the taps of the tapped-delay line; correlating a first group of the plurality of TDL-chip sequences and inverse-TDL-chip sequences generated by the tapped-delay line; outputting a first correlation pulse from a first transducer in response to the spread-spectrum signal being modulated by the chip sequence; correlating a second group of the plurality of TDL-chip sequences and inverse-TDL-chip sequences generated by the tapped-delay-line; outputting a second correlation pulse from the second transducer in response to the spread-spectrum signal being modulated by the reciprocal-chip sequence; and outputting from a decision circuit the first bit and the second bit in response to the first correlation pulse and the second correlation pulse being outputted from the first transducer and the second transducer, respectively.

It will be apparent to those skilled in the art that various modifications can be made to the system using a surface-acoustic-wave correlator or other analog correlators, a including but not limited to charged-coupled devices, for decoding a spread-spectrum signal of the instant invention with out departing from the scope or spirit of the invention, and it is intended that the present invention cover modifications and variations of the system using the surface-acoustic-wave correlator provided they come in the scope of the appended claims and their equivalence. Such modifications and variations include, but are not limited to, applying the surface-acoustic-wave correlator to communications systems employing other type of phase modulation such as QPSK and M-ary PSK.

In a preferred alternative embodiment, other forms of phase modulation may be used, such as QPSK, OQPSK, MSK, SFSK, CPSM or "chirp" modulation. In QPSK, the system of FIG. 1 is operated in a manner similar to the BPSK case. The data device 13 outputs a data-symbol sequence, which may be a data-bit sequence comprising 1-bits and 0-bits. The code generator 14 may generate a spreading code or codes such as a PN code or codes for QPSK modulation of the data-symbol sequence. The chip sequence controller 11 may output a sequence of chip sequences and reciprocal-chip sequences in response to the data-symbol sequence.

The signal source 16 may generate a carrier signal, and the phase modulator 12 may modulate the carrier signal with the sequence of chip sequences and reciprocal-chip sequences from the chip sequence controller 11, using QPSK. For example, it may select, in response to two data bits, one of four phase delays for a segment of the carrier signal. (QPSK is well known in the art, and is described in detail in Robert C. Dixon, *Spread Spectrum Systems*.) The spread-spectrum signal may comprise the carrier signal modulated by the output from the chip sequence controller 11 by means of QPSK, and may be transmitted to the power device 21 and ultimately to the communications channel 15, in manner similar to the BPSK case.

In QPSK, the receiver of FIGS. 2 and 3 is operated in a manner similar to the BPSK case. The receiver front end 17 may receive the spread-spectrum signal from the communications channel 15 and transmit that signal to a tapped-delay-line 30 and ultimately to the first transducer 36 and the second transducer 37, in manner similar to the BPSK case. The received spread-spectrum signal may be applied to the tapped-delay-line bus, which may convert the electrical signal to acoustical energy. However, rather than simply adding acoustical energy which is in-phase or out-of-phase, the QPSK signal may sum to a correlation pulse which is in one of a plurality of phase relations. The receiver may determine, in response to the phase relation of the QPSK correlation pulse and in response to whether a chip sequence or a reciprocal-chip sequence was received, a plurality of data bits.

In MSK, the system of FIG. 1 is again operated in a manner similar to the BPSK case. The data device 13 outputs a data-symbol sequence, which may be a data-bit sequence comprising 1-bits and 0-bits. The code generator 14 may generate a spreading code such as a PN code for MSK modulation of the data-symbol sequence. The chip sequence controller 11 may output a sequence of chip sequences and reciprocal-chip sequences in response to the data-symbol sequence.

The signal source 16 may generate a carrier signal, and the phase modulator 12 may modulate the carrier signal with the sequence of chip sequences and reciprocal-chip sequences from the chip sequence controller 11, using MSK. For example, it may select, in response to a data bit, one of two frequencies for a segment of the carrier signal. (MSK is well known in the art, and is described in detail in Robert C. Dixon, *Spread Spectrum Systems*.) The spread-spectrum signal may comprise the carrier signal modulated by the output from the chip sequence controller 11 by means of MSK, and may be transmitted to the power device 21 and ultimately to the communications channel 15, in manner similar to the BPSK case.

In MSK, the receiver of FIGS. 2 and 3 is operated in a manner similar to the BPSK case. The receiver front end 17 may receive the spread-spectrum signal from the communications channel 15 and transmit that signal to a tapped-delay-line 30 and ultimately to the first transducer 36 and the second transducer 37, in manner similar to the BPSK case. The received spread-spectrum signal may be applied to the tapped-delay-line bus, which may convert the electrical signal to acoustical energy. However, rather than simply adding acoustical energy which is in-phase or out-of-phase, the MSK signal may sum to a correlation pulse which is dominated by one of a plurality of frequency components, which may be filtered by the receiver after it is reconverted back to electrical energy. The receiver may determine, in response to the frequency components of the MSK correlation pulse and in response to whether a chip sequence or a reciprocal-chip sequence was received, a plurality of data bits.

In "chirp" modulation, the system of FIG. 1 is again operated in a manner similar to the BPSK case. The data device 13 outputs a data-symbol sequence, which may be a data-bit sequence comprising 1-bits and 0-bits.

The signal source 16 may generate a carrier signal, and the phase modulator 12 may modulate the carrier signal with a sequence of frequency sweeps, either from a first frequency to a second frequency, or in reverse, from the second frequency to the first frequency, using chirp modulation. For example, it may select, in response to a data bit, either an upward frequency sweep or a downward frequency sweep. (Chirp modulation is well known in the art, and is described in detail in Robert C. Dixon, *Spread Spectrum Systems*.) The spread-spectrum signal may comprise the carrier signal modulated by means of chirp modulation, and may be transmitted to the power device 21 and ultimately to the communications channel 15, in manner similar to the BPSK case.

In chirp modulation, the receiver of FIGS. 2 and 3 is operated in a manner similar to the BPSK case. The receiver front end 17 may receive the spread-spectrum signal from the communications channel 15 and transmit that signal to a tapped-delay-line 30 (or transversal filter) and ultimately to the first transducer 36 and the second transducer 37, in a manner similar to the BPSK case. The received spread-spectrum signal may be applied to the tapped-delay-line bus, which may convert the electrical signal to acoustical energy. Acoustical energy may be summed by a delay line (operated as a dispersive filter) which sums the energy over a range of frequencies, creating a correlation pulse. Accordingly, the acoustical energy may be summed and reconverted back to electrical energy, which may be filtered or otherwise processed by the receiver. The receiver may determine a data bit in response to the chirp correlation pulse and in response to whether the pulse involved an upward frequency sweep or a downward frequency sweep.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A correlator for decoding a spread-spectrum signal having a data signal modulated with a plurality of chip sequences and reciprocal-chip sequences, comprising
    a tapped-delay-line having a plurality of taps defining a tapped-delay-line structure matched to the chip sequence, responsive to a plurality of first chips and second chips embedded in the spread-spectrum signal, and capable of generating a plurality of first chip sequences and a plurality of second chip sequences, said second chip sequences being reciprocal forms of said first chip sequences, respectively;
    a first transducer, responsive to the spread-spectrum signal modulated by the chip sequence, capable of correlating a first group of the plurality of first chip sequences and second chip sequences generated by said tapped-delay-line and capable of outputting a first correlation pulse;
    a second transducer, responsive to the spread-spectrum signal modulated by the reciprocal-chip sequence, capable of correlating a second group of the plurality of first chip sequences and second chip sequences generated by said tapped-delay-line and capable of outputting a second correlation pulse; and
    a decision circuit responsive to the first correlation pulse and the second correlation pulse.

* * * * *